(No Model.)

S. WILCOX.
GREASE TRAP.

No. 280,545. Patented July 3, 1883.

WITNESSES:
Francis McArdle.
C. Sedgwick

INVENTOR:
S. Wilcox
BY Munn & Co
ATTORNEYS.

UNITED STATES PATENT OFFICE.

SILAS WILCOX, OF PORTLAND, OREGON.

GREASE-TRAP.

SPECIFICATION forming part of Letters Patent No. 280,545, dated July 3, 1883.

Application filed January 17, 1883. (No model.)

*To all whom it may concern:*

Be it known that I, SILAS WILCOX, of Portland, in the county of Multnomah and State of Oregon, have invented a new and Improved Grease-Trap, of which the following is a full, clear, and exact description.

The object of my invention is to prevent greasy substances and other matters from passing into waste-pipes from sinks and basins, so as to prevent obstructions of the waste-pipe, and also to save such greasy and fatty matters, which otherwise would be wasted.

Reference is to be had to the accompanying drawings, forming part of this specification, in which similar letters of reference indicate corresponding parts in all the figures.

Figure 1:
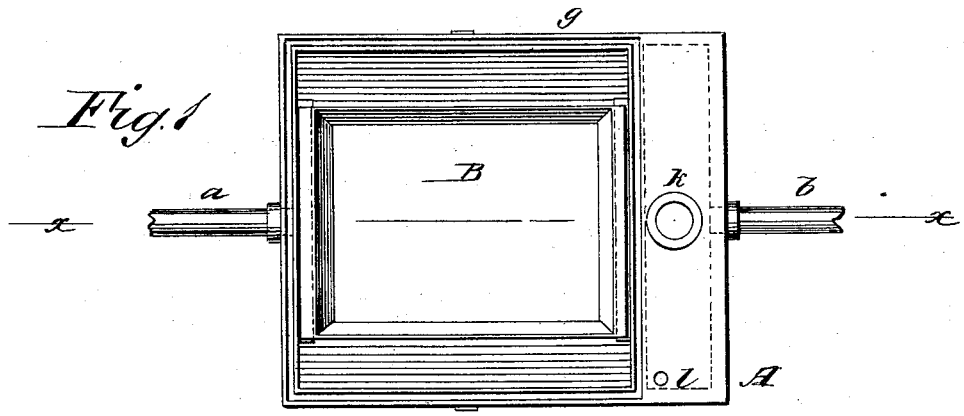
Figure 2:
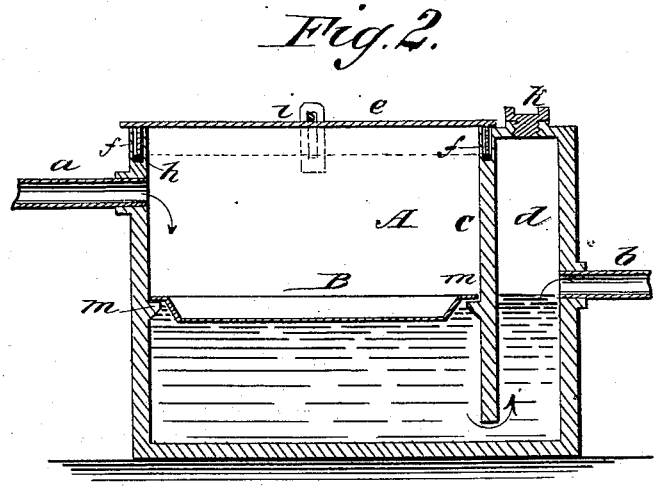
Figure 3:

Figure 1 is a plan view of the trap with the cover removed. Fig. 2 is a vertical section on line $xx$, Fig. 1. Fig. 3 is a detail view of the wedge.

The body of the trap A may be made of any suitable form and size and of any suitable material. As shown, it is made in the form of a box, having an inlet at $a$ and an outlet at $b$. The box is divided at one end by a vertical partition, $c$, that forms a small compartment, $d$, which is closed at the top, and communicates with the main part of the box by a slit or space at the bottom of the partition $c$. The main part of the box is provided with a removable cover, $e$, that is provided with an under rim or flange, $f$, which enters a groove, $g$, formed around the upper edge of the box. This groove $g$ is to contain water or other liquid, so as to form an air-tight seal around the edge of the cover, and, in addition thereto, rubber packing $h$ is placed in the bottom of the groove, so that the rim $f$ can be forced down tightly by means of the wedges $i$, Fig. 3, that are inserted through staples attached to the sides of the box. This construction insures the cover's being air-tight, and also allows of its ready removal to clean the trap. The cover of the smaller compartment, $d$, is provided with a screw-plug at $k$, which gives access for cleaning, and a hole may be provided at $l$, for allowing the inlet of air for the purpose of ventilating the trap, and also to prevent siphoning. Within the larger compartment of the trap is a pan or plate, B, resting upon ledges $m$; or it may be secured in place in any other desired manner at a level with the exit-pipe $b$, so that it shall be just at the water-level. This pan or plate extends from side to side of the box in either direction, but is made narrower than the box at its other sides, so as to give space for the water to pass at the sides of the pan. The pan may be made of any suitable material and of any desired form or shape.

In operation the water passing in the pipe at $a$ first falls upon the pan B, leaves therein matter of the same or nearly the same specific gravity, and then escapes at the sides of the pan, leaving the grease on the surface of the water. The lower part of the trap contains water at all times up to the level of the pipe $b$, so that the escaping water passes from the lower part of the main compartment, through beneath the bottom of the partition $c$, to the compartment $d$. The current of water passing in at the pipe $a$ being thus checked, the grease, crumbs, and other material are caused to settle on the pan B and the surface of the water, so that the water passes off without any grease or solid matters which might obstruct the water-pipe. By removing the cover of the trap the pan can be taken out for cleaning from time to time, as required, and the grease and fatty matters thus saved, and the obstruction of the waste-pipe by such matters avoided.

I do not limit myself to the particular construction and arrangement shown, as they may be varied within the scope of my invention.

Having thus described my invention, what I claim as new, and desire to secure by Letters Patent, is—

1. The combination, with the trap or box A, having inlet and outlet pipes $a\ b$, of the plate or pan B, substantially as and for the purpose specified.

2. The combination, with the trap-body A, having the inlet $a$ and the outlet $b$ at a less altitude, of a pan, B, supported on two sides at the level of the water, but made narrower than the trap-body in the space between the other two sides, whereby the water may pass first into the pan and then over one side of it, as and for the purpose specified.

3. The trap-body having ledges $m\ m$ on the partition and one of its sides, in combination with a pan, B, having a horizontal rim adapted to rest on said ledges, as shown and described.

4. The combination of the cover e, having the perpendicular flange, with the trap-body having side staples and groove g, the packing h, arranged in the bottom of said groove, and the wedges i, whereby the rim f may be embedded at its bottom in the packing, as described.

5. The combination of the box A, the inlet-pipe a, and outlet-pipe b with removable cover e and pan B, substantially as and for the purpose specified.

SILAS WILCOX.

Witnesses:
X. N. STEEVES,
E. MENDENHALL.